(12) United States Patent
Wang

(10) Patent No.: US 7,791,767 B2
(45) Date of Patent: *Sep. 7, 2010

(54) REPEATED SAMPLING FOR IMAGE SCANNING

(76) Inventor: Kuo-Jeng Wang, No. 14, KungAn St., FangKung Li, HsiaoKang District, KaoHsiung (TW)

( * ) Notice: Subject to any disclaimer, the term of this patent is extended or adjusted under 35 U.S.C. 154(b) by 827 days.

This patent is subject to a terminal disclaimer.

(21) Appl. No.: 11/493,713

(22) Filed: Jul. 25, 2006

(65) Prior Publication Data

US 2007/0053012 A1    Mar. 8, 2007

Related U.S. Application Data

(63) Continuation of application No. 10/060,702, filed on Jan. 30, 2002, now Pat. No. 7,085,022.

(51) Int. Cl.
  *H04N 1/40* (2006.01)
(52) U.S. Cl. .................. 358/445; 358/465; 358/463
(58) Field of Classification Search .................. 358/445, 358/465, 466, 463, 462, 488, 474; 382/270, 382/272, 275
  See application file for complete search history.

(56) References Cited

U.S. PATENT DOCUMENTS 5,568,530 A    10/1996    Saito et al.

7,085,022 B2 *    8/2006    Wang .................... 358/445

OTHER PUBLICATIONS

Li, Zhong-Ke, et al., "Analysis System of Three-dimensional Laser Measurement of Tooth Chin Mold—Scanning Control Software", Practical Stomatology Magazine, Jul. 1995, pp. 205-206, vol. 11, Issue 3, China.

* cited by examiner

*Primary Examiner*—Cheukfan Lee
(74) *Attorney, Agent, or Firm*—Stolowitz Ford Cowger LLP

(57) ABSTRACT

The present disclosure provides a repeated sampling method for image scanning. In one or more embodiments, the sampling method may comprise a sample treatment procedure for the data of an image scanning device during the scanning of an image. The method may comprise sampling, sorting, eliminating one or more group-departing values, and getting a mean value, etc. The sampling procedure may involve scanning a single point of the image several times to produce several sets of sampling values. The sorting procedure may involve sorting the several sets of sampling values after being sampled according to their magnitude. The eliminating group-departing values procedure may involve obtaining the relatively larger values and relatively smaller values from the several sets of sampling values after being sorted. The getting mean value procedure may involve obtaining a mean value from the several sets of sampling values. By applying the repeated sampling method the error of data pick-up during the procedure of scanning may be reduced.

41 Claims, 4 Drawing Sheets

REPEATED SAMPLING FOR IMAGE SCANNING

CROSS REFERENCE TO RELATED APPLICATIONS

The present application is a continuation of application Ser. No. 10/060,702 filed Jan. 30, 2002, now U.S. Pat. No. 7,085,022 the entirety of which is hereby incorporated herein by reference thereto.

TECHNICAL FIELD

The present invention is a repeatedly sampling method for image scanning, especially to a data sampling method proceeded for the data sampling procedure of image scanning in an image scanning device through the procedures of sampling, sorting, eliminating group-departing value, and getting mean value, etc.

BACKGROUND OF THE INVENTION

Accordingly, the method of image pick-up by a scanner in the traditional manner has already been well known to the general business widely. The typically picked up image is stored in the memory by the manner of a digital formation of image element data array. The common types of scanner include: the roller scanner, the flatbed scanner, the two-dimensional scanner, and the palm scanner, etc. For any kind of above-mentioned scanners, it always proceeds a picking-up motion of scanned data on the image.

During the common procedure of scanning by a scanner on a specific image to be scanned, every single point constituting the image, that may be constituted by extremely many single points, may be scanned by the scanner, but usually the response of the darker part of an image is smaller, so it may easily be interfered with by noises. The originally unnecessary noises may be generated during the scanning procedure. The scanning quality of the entire image may therefore be influenced.

Since the noise is unpredictable and its occurrence is out of expectation, so it usually depends on the software design of a scanner to improve the performance and overcome the problems created by the poor quality of the manuscript. In general, it is impossible to require the manuscript image to maintain an extremely high quality. Further, the design quality of the scanner itself is also a main factor of influencing the scanning quality. Therefore, it often occurs the situations that the obtained data has too large difference from the reasonable data or the data after being scanned has great deviation from the original image. Thus, how to solve this kind of problem has become the most important topics nowadays.

SUMMARY OF THE INVENTION

The present invention is a further improvement to solve the above-mentioned shortcomings generated by the prior arts. The invention expects to eliminate too much noise interference to further promote the quality of the scanned image to reach the optimal level that the scanned image is almost close to the original image. Thus, the main object of the invention is to proceed a repeated sampling on a specific point in the image and further to sort, eliminate group-departing value, and also get mean value of the sampling data in expectation to get the optimal quality of scanned image that is most close to the original image.

In an embodiment, the scanning procedure may comprise sampling, sorting, eliminating one or more group-departing values, and getting a mean value, etc. The sampling procedure may involve scanning a single point of the image several times to produce several sets of sampling values. The sorting procedure may involve sorting the several sets of sampling values after being sampled according to their relative magnitudes. The eliminating group-departing values procedure may involve obtaining the relatively larger values and relatively smaller values from the several sets of sampling values after being sorted. The getting mean value procedure gets a mean value from the several sets of sampling values and the mean value may be obtained as the following up treatment of the image scanning on the single point.

A characteristic of an embodiment is to store the result in a buffer or a memory or relative storing devices after the mean value is obtained.

Another characteristic of the invention is, when applying scanning on a single point, to take the procedures of sampling, sorting, eliminating group-departing value, and getting a mean value on every four points as a cycle and execute them repeatedly and finally a last mean value is again gotten from each mean value for being provided for the treatment of the following up action.

DETAILED DESCRIPTION OF THE PREFERRED EMBODIMENT

The present invention discloses a repeatedly sampling method for image scanning. It may be applied in a data sampling procedure proceeded by an image-scanning device during a scanning of image. For example, in the scanning procedure of a scanner applied on a manuscript to be scanned, after the scanner has scanned every point constituted the image, the procedures of repeated sampling and relative treatments are also made.

Figure 1:
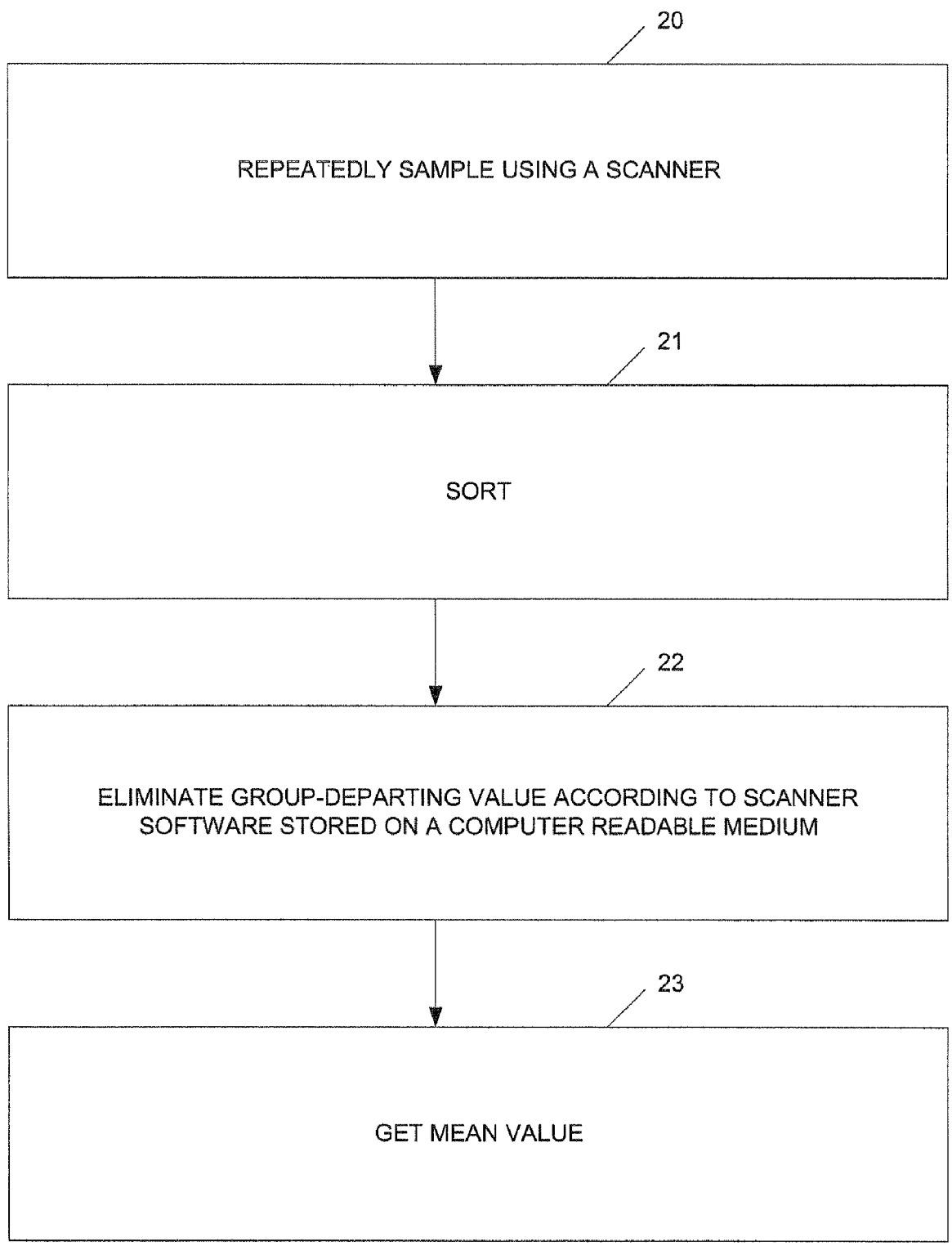
FIG. 1 is a flowchart diagram of an embodiment.

Please refer to FIG. 1, which is a flowchart diagram of an embodiment.

The operations shown in FIG. 1 are as follows:

a. repeatedly sample 20;

b. sort 21;

c. eliminate group-departing value 22;

d. get mean value 23.

Wherein, the repeated sample 20 as described in "a" is to repeatedly scan a specific single point of an image to be scanned. After the scanning, several sets of sampling values may be obtained from a single point. This is repeatedly sampling 20 in FIG. 1. After the several sets of sampling values are obtained, sort 21 may be accomplished on the several sets of sampling values.

The sort 21 as described in "b" is to relatively sort the several sets of sampling values obtained from the repeated sampling according to the magnitude of their values, and wherein the sorting sequence may be arranged from a relatively small value to a relatively large value, or from a relatively large value to a relatively small value.

The eliminate group-departing value 22 as described in "c" is to proceed the motion of eliminating several sets of sampling values for the several sets of sampling values after being sorted; namely, the relatively larger values and relatively smaller values are eliminated from the several sets of sampling values after being sorted.

The get mean value 23 as described in "d" is to pick up a mean value from the several sets of sampling values after the eliminate group-departing value 22, and the mean value is then the data of treatment in the follow up procedure of treatment after the single point pick-up completed by the scanner, and wherein the obtained mean value is temporarily stored in a buffer for the follow up treatment.

When eliminating one or more group-departing values, a middle value may be found from the several sets of sampling values and a deviation of specific range is set up on the basis of the middle value, and any value exceeding this deviation range may then be given up, and other values within the range of this deviation may be retained, and getting mean value is again accomplished afterwards.

Or, when eliminating the group-departing value, by relatively comparing the several sets of sampling value, the largest and smallest values are given up constantly, or the relatively larger value and relatively smaller value are given up from the several sets.

In the repeated sampling, the single point is proceeded by the repeated scanning and sampling for collecting more data from the single point to avoid the errors generated from getting data from the single point due to the influence of noises or random noises. Furthermore, after getting the several sets of sampling values, a set of data that is closer to the original image may be selected, so in this embodiment, a last mean value that is gotten out from the several sets of sampling values is the data closer to the original image.

Further, the method described in FIG. 1 is not restricted to only one time. It may also be executed many times; namely the method described in this preferable embodiment may be proceeded one time or further more times on a single point.

The device for storing the mean value is not restricted to the buffer. Any device capable of storing data may be available to the design. For example, the mean value may also be stored in a memory or a register. When storing in the memory, each mean value may be stored in different positions.

Figure 2:
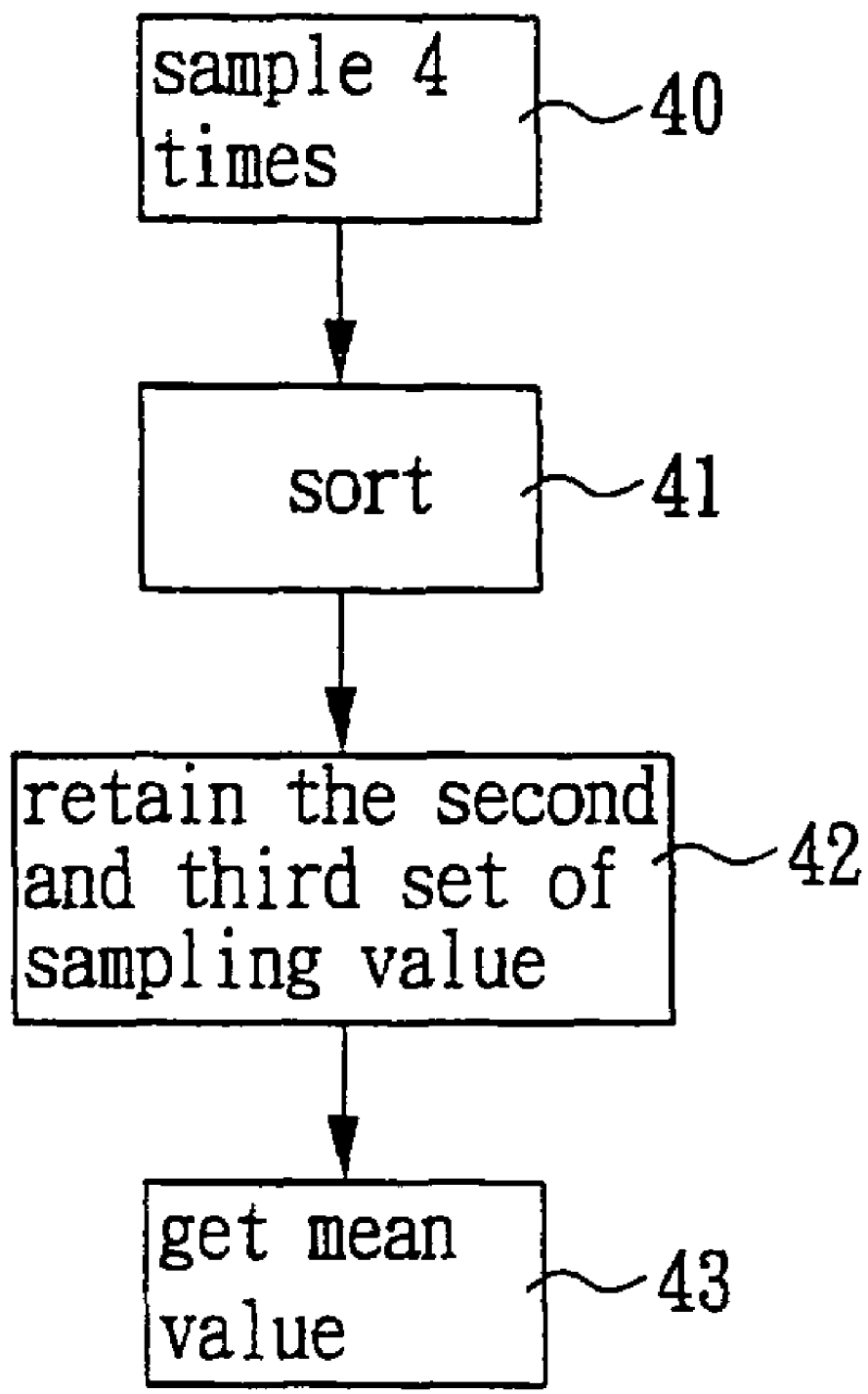
FIG. 2 is a flowchart diagram of an embodiment, wherein a single point of an image may be sampled four times.

Please refer to FIG. 2, which is an embodiment, wherein a single point of an image is being sampled four times. As shown in FIG. 2, a single point of an image is sampled four times at 40. For example, the obtained four sets of sampling values are 36, 35, 39, 31 respectively; further through sorting 41, the four sets of sampling values are sorted according to their magnitudes, and the result after sorting is (31, 35, 36, 39); again through the motion of eliminating one or more group-departing values the first set of sampling value 31 and the fourth set of sampling value 39 are given up; namely, at 42 second set and third set of sampling values are retained, and the second set of sampling value is 35, and the third set of sampling value is 36; further at 43, a mean value is taken from the second set of sampling value 35 and the third set of sampling value 36, and therefore the mean value is (35+36)/2=35.5.

Figure 3:
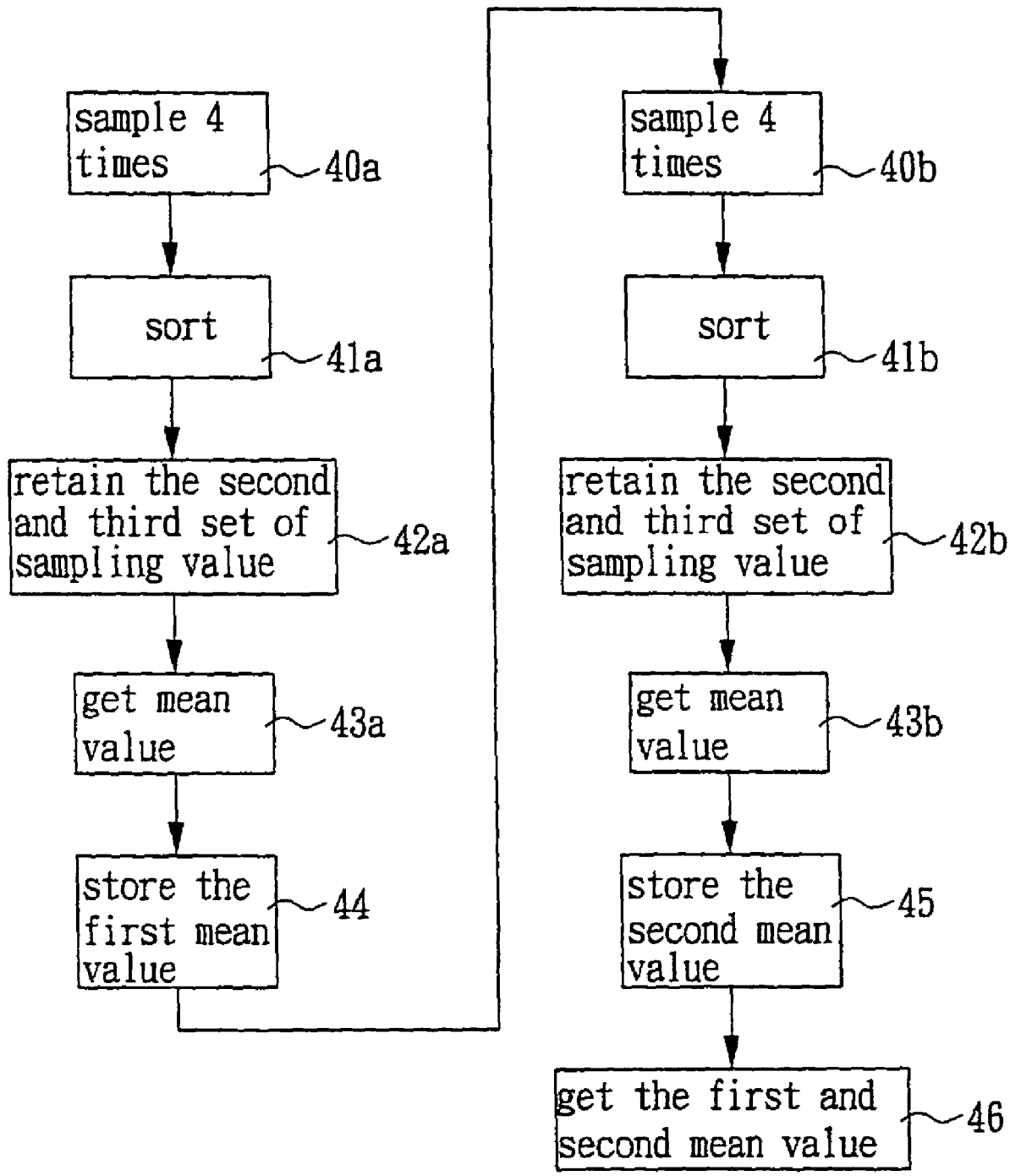
FIG. 3 is a flowchart diagram of an embodiment, wherein a single point of an image may be sampled eight times.

Please refer to FIG. 3, which is an embodiment, wherein a single point of an image is being sampled eight times. If 40a through 43a shown in FIG. 3 are same as 40 through 43 exemplified in FIG. 2, then storing the first mean value is further added and the obtained mean value 37.5 is stored in a buffer (not shown in the figures).

Further, 40b through 43b are accomplished. For example, the second term for sampling the single point is still four times. Through the 40b sampling on the single point is applied four times, the obtained four sets of sampling values are 34, 36, 32, 38 respectively; further through sorting, at 41b, the four sets of sampling values are sorted according to their magnitudes, and the result after sorting is (32, 34, 36, 38); again through the motion of eliminating one or more group-departing values the first set of sampling value 32 and the fourth set of sampling value 38 are given up; namely, at 42b, second set and third set of sampling values are retained, and the second set of sampling value is 34, and the third set of sampling value is 36; further at 43b, a mean value is taken from the second set of sampling value 34 and the third set of sampling value 36, and therefore a mean value (34+36)/2=35 is obtained.

Storing the second mean value is accomplished. The mean value 35 is stored in a buffer (not shown in the figure). At this time, 46 a mean value from the two mean values is obtained. Therefore, the obtained mean value is (35+35.5)/2=35.25.

Figure 4:
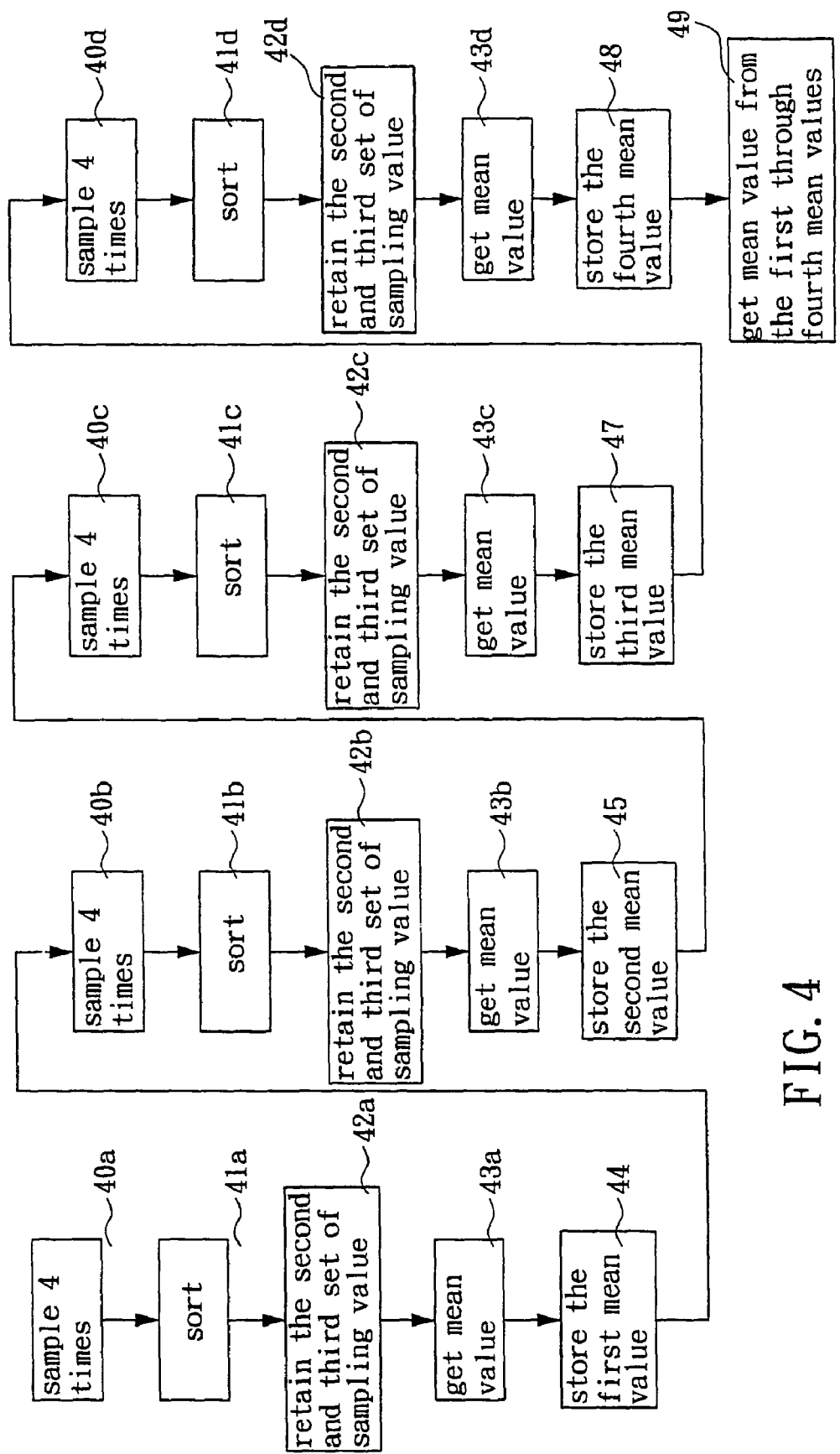
FIG. 4 is a flowchart diagram of an embodiment, wherein a single point of an image may be sampled sixteen times.

Please refer to FIG. 4, which is an embodiment wherein a single point of an image is being sampled sixteen times. If 40a through 43a, 40b through 43b shown in FIG. 4 are same as those in FIG. 3 and the third mean value gotten from 40c through 43c is 36, and the fourth mean value obtained from 40d through 43d is 34.5, then the four mean values (35, 35.5, 36, 34.5) are stored in the buffer respectively at 44, 45, 47, 48, here, storing mean value. At this time, at 49, a mean value from the first through fourth mean values is obtained, and the final mean value is (35+35.5+36+34.5)/4=35.25.

Or, a mean value is first taken from (35, 35.5), i.e., (35+35.5)/2=35.25; a mean value is further taken from (36, 34.5), i.e., (36+34.5)=35.25; next, a mean value further taken from (35.25, 35.25) is still 35.25. This result is still the same as that of the previous method. The difference is that the previous method takes more buffering memory and the requirement of buffering memory in this method is less.

Through the description of above-mentioned embodiments, the method provided may effectively promote the quality of image scanning, and through the design of scanning times, for example, the method of sampling, sorting, further getting mean values may reduce the usage of space in buffering memory. In the described embodiments, the sampling times on a specific single point or the implemented times according to the method disclosed are not restricted because of the description in the embodiments. Actually, the user may make appropriate design and application according to the actual situation.

What is claimed is:

1. A method, comprising:
    sampling at least one point of an image a plurality of times using a scanning device to produce a plurality of sample values;
    analyzing magnitudes of the sample values to identify a subset of the sample values, wherein the identified subset includes at least a sample value having a largest or smallest magnitude;
    eliminating the sample value subset;
    obtaining a mean value from remaining sample values after the eliminating; and
    storing the mean value in a storage device.

2. The method of claim 1, further comprising:
    determining a middle value of the sample values;
    determining a deviation range from the middle value; and
    eliminating any sample values having a magnitude falling outside the deviation range from the middle value.

3. The method of claim 1, wherein the storage device is at least one of a buffer, a memory, and a register.

4. The method of claim 1, further comprising executing the sampling, the analyzing, the eliminating and the obtaining an additional time, storing a mean value for the additional time, and determining a new mean value based on the stored mean values.

5. The method of claim 1, further comprising executing the sampling, the analyzing, the eliminating and the obtaining four times.

6. The method of claim 1, further comprising executing the sampling, the analyzing, the eliminating and the obtaining four times, and further comprising storing mean values for the four times in the storage device, and obtaining an updated mean value based on a mean of the mean values for the four times.

7. The method of claim 1, further comprising executing the sampling, the analyzing, the eliminating and the obtaining eight times.

8. The method of claim 1, further comprising executing the sampling, the analyzing, the eliminating and the obtaining eight times, and further comprising obtaining a first mean value for a first time through a fourth time, obtaining a second mean value for a fifth time through an eighth time, and obtaining an updated mean value of the first mean value and the second mean value.

9. The method of claim 1, further comprising executing the sampling, the analyzing, the eliminating and the obtaining sixteen times, and further comprising obtaining a first mean value for a first time through a fourth time, obtaining a second mean value for a fifth time through an eighth time, obtaining a third mean value for a ninth time through a twelfth time, and obtaining a fourth mean value for a thirteenth time through a sixteenth time, and obtaining a new mean value of the first mean value, second mean value, third mean value, or fourth mean value, or combinations thereof.

10. The method of claim 1, further comprising executing the sampling, the analyzing, the eliminating and the obtaining sixteen times, and further comprising obtaining a first mean value for a first time through a fourth time, obtaining a second mean value for a fifth time through an eighth time, obtaining a third mean value for the first mean value and the second mean value, obtaining a fourth mean value for a ninth time through a twelfth time, obtaining a fifth mean value for a thirteenth time through a sixteenth time, obtaining a sixth mean value of the fourth mean value and the fifth mean value, and obtaining an updated mean value of the third mean value and the sixth mean value.

11. An apparatus, comprising:
circuitry configured to:
sample a region of an image a plurality of times to produce a plurality of sample values;
analyze magnitudes of the sample values to identify at least one sample value having an outlier magnitude value; and
obtain a mean value from a subset of the sample values, wherein the subset excludes the identified sample value or values.

12. The apparatus of claim 11, wherein the circuitry is configured to:
determine a middle value of the sample values;
determine a deviation range from the middle value; and
eliminate any sample values having a magnitude falling outside the deviation range from the middle value.

13. The apparatus of claim 11, wherein the circuitry is configured to store the mean value in a storage device.

14. The apparatus of claim 13, wherein the circuitry is configured to sample, analyze, and obtain an additional time, store a mean value for the additional time, and determine a new mean value based on the stored mean values.

15. The apparatus of claim 13, wherein the circuitry is configured to sample, analyze, and obtain four times, and store a mean value for the four times in the storage device, and obtain an updated mean value based on a mean of the mean values for the four times.

16. The apparatus of claim 11, wherein the circuitry is configured to sample, analyze, and obtain four times.

17. The apparatus of claim 11, wherein the circuitry is configured to sample, analyze, and obtain eight times.

18. The apparatus of claim 11, wherein the circuitry is configured to sample, analyze, and obtain eight times, and further being configurable to obtain a first mean value for a first time through a fourth time, obtain a second mean value for a fifth time through an eighth time, and obtain an updated mean value of the first mean value and the second mean value.

19. The apparatus of claim 11, wherein the circuitry is configured to sample, analyze, and obtain sixteen times, and further being configurable to obtain a first mean value for a first time through a fourth time, obtain a second mean value for a fifth time through an eighth time, obtain a third mean value for a ninth time through a twelfth time, and obtain a fourth mean value for a thirteenth time through a sixteenth time, and obtain a new mean value of the first mean value, second mean value, third mean value, or fourth mean value, or combinations thereof.

20. The apparatus of claim 11, wherein the circuitry is configured to sample, analyze, and obtain sixteen times, and further being configurable to obtain a first mean value for a first time through a fourth time, obtain a second mean value for a fifth time through an eighth time, obtain a third mean value for the first mean value and the second mean value, obtain a fourth mean value for a ninth time through a twelfth time, obtain a fifth mean value for a thirteenth time through a sixteenth time, obtain a sixth mean value of the fourth mean value and the fifth mean value, and obtain an updated mean value of the third mean value and the sixth mean value.

21. The apparatus of claim 11, wherein the circuitry is configured to eliminate at least one of the sample values having a magnitude greater than a first predetermined value or less than a second predetermined value, or combinations thereof.

22. An apparatus, comprising:
means for sampling a region of an image a plurality of times to produce a plurality of sample values;
means for sorting the sample values after being sampled according to magnitude;
means for eliminating a maximum magnitude or minimum magnitude one of the sample values, or combinations thereof; and
means for obtaining a mean value from a remaining subset of the sample values after the means for eliminating eliminates at least one of the sample values.

23. The apparatus of claim 22, the means for eliminating comprising:
means for determining a middle value of the sample values;
means for determining a deviation range from the middle value; and
means for eliminating any sample values having a magnitude falling outside the deviation range from the middle value.

24. The apparatus of claim 22, further comprising means for storing the mean value.

25. The apparatus of claim 24, further comprising means for executing the sampling, the sorting, the eliminating and the obtaining an additional time, means for storing a mean value for the additional time, and means for determining a new mean value based on the stored mean values.

26. The apparatus of claim 22, further comprising means for executing the sampling, the sorting, the eliminating and the obtaining four times.

27. The apparatus of claim 22, further comprising means for executing the sampling, the sorting, the eliminating and the obtaining four times, and further comprising means for storing mean values for the four times, and means for obtaining an updated mean value based on a mean of the mean values for the four times.

28. The apparatus of claim 22, further comprising means for executing the sampling, the sorting, the eliminating and the obtaining eight times.

29. The apparatus of claim 22, further comprising means for executing the sampling, the sorting, the eliminating and the obtaining eight times, and further comprising means for obtaining a first mean value for a first time through a fourth time, means for obtaining a second mean value for a fifth time through an eighth time, and means for obtaining an updated mean value of the first mean value and the second mean value.

30. The apparatus of claim 22, further comprising means for executing the sampling, the sorting, the eliminating and the obtaining sixteen times, and further comprising means for obtaining a first mean value for a first time through a fourth time, means for obtaining a second mean value for a fifth time through an eighth time, means for obtaining a third mean value for a ninth time through a twelfth time, and means for obtaining a fourth mean value for a thirteenth time through a sixteenth time, and means for obtaining a new mean value of the first mean value, second mean value, third mean value, or fourth mean value, or combinations thereof.

31. The apparatus of claim 22, further comprising means for executing the sampling, the sorting, the eliminating and the obtaining sixteen times, and further comprising means for obtaining a first mean value for a first time through a fourth time, means for obtaining a second mean value for a fifth time through an eighth time, means for obtaining a third mean value for the first mean value and the second mean value, means for obtaining a fourth mean value for a ninth time through a twelfth time, means for obtaining a fifth mean value for a thirteenth time through a sixteenth time, means for obtaining a sixth mean value of the fourth mean value and the fifth mean value, and means for obtaining an updated mean value of the third mean value and the sixth mean value.

32. A method, comprising:
sampling at least one point of an image a plurality of times using a scanning device to produce a plurality of sample values;
sorting the sample values after the sampling;
eliminating any of the sample values having a magnitude greater than a first predetermined value or less than a second predetermined value, or combinations thereof; and
obtaining a mean value from the remaining sample values after the eliminating; and
storing the mean value in a storage device.

33. The method of claim 32, further comprising:
determining a middle value of the sample values;
determining a deviation range from the middle value; and
eliminating any sample values having a magnitude falling outside the deviation range from the middle value.

34. The method of claim 32, wherein the storage device is at least one of a buffer, a memory, and a register.

35. The method of claim 32, further comprising executing the sampling, the sorting, the eliminating, and the obtaining an additional time, the storing a mean value for the additional time, and determining a new mean value based on the stored mean values.

36. The method of claim 32, further comprising executing the sampling, the sorting, the eliminating and the obtaining four times.

37. The method of claim 32, further comprising executing the sampling, the sorting, the eliminating and the obtaining four times, storing mean values for the four times in the storage device, and obtaining an updated mean value based on a mean of the mean values for the four times.

38. The method of claim 32, further comprising executing the sampling, the sorting, the eliminating and the obtaining eight times.

39. The method of claim 32, further comprising executing the sampling, the sorting, the eliminating and the obtaining eight times, obtaining a first mean value for a first time through a fourth time, obtaining a second mean value for a fifth time through an eighth time, and obtaining an updated mean value of the first mean value and the second mean value.

40. The method of claim 32, further comprising executing the sampling, the sorting, the eliminating and the obtaining sixteen times, obtaining a first mean value for a first time through a fourth time, obtaining a second mean value for a fifth time through an eighth time, obtaining a third mean value for a ninth time through a twelfth time, obtaining a fourth mean value for a thirteenth time through a sixteenth time, and obtaining a new mean value of the first mean value, second mean value, third mean value, or fourth mean value, or combinations thereof.

41. The method of claim 32, further comprising executing the sampling, the sorting, the eliminating and the obtaining sixteen times, obtaining a first mean value for a first time through a fourth time, obtaining a second mean value for a fifth time through an eighth time, obtaining a third mean value for the first mean value and the second mean value, obtaining a fourth mean value for a ninth time through a twelfth time, obtaining a fifth mean value for a thirteenth time through a sixteenth time, obtaining a sixth mean value of the fourth mean value and the fifth mean value, and obtaining an updated mean value of the third mean value and the sixth mean value.

* * * * *

UNITED STATES PATENT AND TRADEMARK OFFICE
CERTIFICATE OF CORRECTION

| | | |
|---|---|---|
| PATENT NO. | : 7,791,767 B2 | |
| APPLICATION NO. | : 11/493713 | |
| DATED | : September 7, 2010 | |
| INVENTOR(S) | : Wang | |

It is certified that error appears in the above-identified patent and that said Letters Patent is hereby corrected as shown below:

Column 7, lines 49-50, in Claim 32, delete "thereof; and" and insert -- thereof; --.

Column 8, line 10, in Claim 35, delete "time, the storing" and insert -- time, storing --.

Signed and Sealed this
Twenty-seventh Day of March, 2012

David J. Kappos
*Director of the United States Patent and Trademark Office*